United States Patent Office 2,938,006
Patented May 24, 1960

2,938,006

ROSIN MODIFIED POLY(ALKYLENE FUMARATE)

Frank B. Root, Waterbury, Conn., assignor to United States Rubber Company, New York, N.Y., a corporation of New Jersey No Drawing. Filed May 15, 1959, Ser. No. 813,347

7 Claims. (Cl. 260—26)

This invention relates to a resin comprising a polymerizable improved rosin adduct of a poly(alkylene fumarate), the rosin component being selected from the class consisting of wood rosin, gum rosin, tall oil rosin, and abietic acid.

This application is a continuation-in-part of my application Serial No. 623,523, filed November 21, 1956, now abandoned.

The adduct is substantially completely the Diels-Alder reaction product of the rosin and the unsaturated alkyd which is produced from fumaric acid and a dihydric alcohol, i.e., an alkylene glycol, but under conditions that the adduct contains unreacted fumarate groups, so as to provide fumarate double bonds available for subsequent cross-linking with any desired copolymerizable vinyl monomer. To so provide, it is necessary that the proportions of the rosin to the polyester of an aliphatic glycol and fumaric acid be less than that equivalent to a 1:1 molar ratio in favor of a higher proportion of said polyester.

In the case of rosin (wood or gum), it is known that it contains several isomeric tricyclic monobasic acids, one of which is laevo pimaric acid, which is believed the major reacting constituent of the rosin acids in the rosin, and without limitation thereto, it is believed that isomerization of the rosin acids to laevo pimaric acid precedes the reaction with the fumarate group of the polyester chain. Since abietic acid is a major component of rosin, it and the rosin are to be considered equivalents for the purpose of this invention.

The amount of the rosin, weight-wise, is from about 30 to about 230 grams of the rosin component for each gram-mole of fumaric acid used, the rosin being considered as abietic acid of molecular weight 302. That is, from $\frac{1}{10}$ to $\frac{3}{4}$ mole of rosin per mole of fumaric acid is used.

The preparation of the unsaturated alkyd, i.e., the poly(alkylene fumarate), follows known procedures in which a glycol (e.g., ethylene glycol, propylene glycol, diethylene glycol, dipropylene glycol, butane-1,3-diol, butane-1,4-diol or triethylene glycol) and fumaric acid are condensed to a polyester, say at about 200° C., until reaction is substantially complete, prior to reaction of the preformed polyester with the rosin at a higher temperature to react the polyfumarate with the rosin constituent. Alternatively, the three basic ingredients may be reacted together at about 190–220° C., in which case the esterification of the fumaric acid by the glycol takes precedence over esterification of the rosin acids, and the Diels-Alder reaction, without isolation of the polyester, follows this at a higher temperature, e.g., about 235° C.–245° C. In the Examples 1 to 4 below, the esterification is unusually rapid because the dissolved rosin yields a more hydrophobic mixture and aids in driving out traces of water during the latter stages of the reaction, and thereby shortens the reaction cycle.

After cooling the modified fumarate polyester, the solid resin is mixed with styrene or any other desired copolymerizable vinyl monomer, along with an inhibitor of polymerization, thereby forming a polymerizable liquid resin comprising the rosin modified alkyd.

The vinyl monomer is preferably styrene but vinyl toluene, vinyl acetate, butyl acrylate, methyl methacrylate, vinyl naphthalene or diallyl phthalate may also be used. The inhibitor of polymerization or stabilizer may be quinone, hydroquinone, pyrocatechol, tert-butyl catechol, resorcinol or aniline.

An outstanding property of the rosin modified alkyd of this invention is that when copolymerized with a copolymerizable vinyl monomer such as styrene, it provides a cured resinous product having unusual resistance to moisture. Exposure of a glass cloth laminate of the cured resinous product, to boiling water for a two hour period, showed almost no reduction in physical properties. The proportion of copolymerizable vinyl monomer is incidental to my invention as such proportions are well-known to resin compounders. Generally, a styrene content ranging from 5% to 95% will be satisfactory, although a range of from 20% to 60% is preferred.

The following examples, in which the parts are by weight, are given to illustrate the invention.

*Example 1*

A five-liter three-necked flask equipped with stirrer, Dean-Stark water-trap and gas-inlet tube was charged with 1410 g. dipropylene glycol, 1160 g. fumaric acid, and 1510 g. wood rosin. Heat was applied and the mixture brought to a mobile state under a blanket of carbon dioxide. Stirring was started and the temperature increased to 200° C. and maintained at 200–210° C. for three hours. The temperature was increased further and maintained at 240° C. for one hour. The alkyd was inhibited with .56 g. of quinone at 200° C.

The alkyd was cooled to about 120° C. and diluted with 1860 g. of styrene. After cooling to room temperature the liquid resin was poured into a container.

*Example 2*

This example is the same as Example 1 except that an increased amount of rosin, 1880 g., was used. The alkyd was inhibited with .61 g. of quinone and diluted with 2045 g. of styrene at 120° C.

*Example 3*

This example is the same as Example 2 except that a further increase in amount of rosin, 2260 g., was used. The alkyd was inhibited with 0.67 g. of quinone at 200° C. and diluted with 2235 g. of styrene at 120° C.

Properties of liquid resin mixes from Examples 1, 2, and 3 are given in the table below.

Resins from Examples 1, 2, and 3 were catalyzed by the addition of 1.5% of benzoyl peroxide and $\frac{1}{8}''$ sheets cast therefrom. Physical properties of the cured resins are given.

|  | Example 1 | Example 2 | Example 3 |
|---|---|---|---|
| Liquid resin: |  |  |  |
| Styrene content, percent. | 33.3 | 33.3 | 33.3. |
| Resin acid number | 57.4 | 66.1 | 74.3. |
| Resin saponification number. | 229 | 217 | 215. |
| Disc viscosity (poises) | 45.3 | 41.2 | 82.9. |
| Styrene compatibility | Infinite | Infinite | Infinite. |
| Specific gravity | 1.070 | 1.0659 |  |
| Cured resin: |  |  |  |
| Tensile, p.s.i. | 6,000 | 5,500 | 2,255. |
| Elongation, percent | 2.0 | 1.4 | .45. |
| ASTM heat distoration temperature. | 88 | 77 |  |
| Water absorption, percent (24 hrs.). | .21 | .20 | .19. |
| Cured specific gravity | 1.136 | 1.130 |  |
| Shrinkage, percent | 5.8 | 5.67 |  |

|  | Example 1 | Example 2 | Example 3 |
|---|---|---|---|
| Rockwell hardness L | 117 | 117 | 113. |
| Rockwell hardness M | 104 | 102 | 94. |
| 12-ply glass-cloth laminate cured at 15 p.s.i.:[1] | | | |
| Flexural strength green | 51,740 p.s.i | 54,000 p.s.i | |
| Flexural stength ½ hr. at 160° F. | 51,650 p.s.i | 49,200 p.s.i | |
| Flexural strength 3 hrs. at 212° F. in water. | 51,270 p.s.i | 53,000 p.s.i | |
| Flexural modulus green | 2.6×10⁶ p.s.i | 2.3×10⁶ p.s.i | |
| Flexural modulus 1 hr. at 160° F. | 2.6×10⁶ p.s.i | 2.04×10⁶ p.s.i | |

[1] Styrene content raised from 33⅓% to 40.3%.

*Example 4*

A seventy-five gallon glass-lined kettle equipped with stirrer, overhead condenser and gas-inlet tube was charged with 211 pounds of dipropylene glycol. The glycol was heated to 75° C. under carbon dioxide at which time 227 pounds of granulated rosin were added portionwise. One hundred and seventy-four pounds of fumaric acid were added and temperature raised to 200° C. over a period of four and one-half hours. This temperature was maintained within five degrees for four hours and then raised to 235° C. and maintained at 235–245° C. for one hour.

The completed alkyd was dropped into a carbon dioxide purged blending tank in which it was cooled. Forty-two grams of quinone were added and 182 pounds of alkyd removed. To the remainder in the blending tank was added 240 pounds of styrene and the resin dropped into holding drums.

A cast sheet ⅛" thick was prepared by addition of one and one-half parts of benzoyl peroxide to 100 parts of the resin and curing at 110° C.

Liquid resin and cured resin properties are given.

Liquid resin (styrene solution of adduct resin):
Alykd acid No. _____ 87
Alkyd sap. No. _____ 337
Styrene content _____percent__ 40
Disc viscosity (poises) _____ 13.0
Cured resin:
Tensile _____p.s.i__ 6340
Elongation _____percent__ 1.5
ASTM heat distortion temperature ____° C__ 85
Rockwell L _____ 113
Rockwell M _____ 98
Water absorption (24 hrs.) _____percent__ +.27

*Example 5*

A two-liter three-necked flask equipped with stirrer, Dean and Stark water-trap and gas-inlet was charged with 232 g. fumaric acid and 157 g. propylene glycol. The mixture was brought to 200° C. with stirring under a blanket of carbon dioxide over a four and one-half hour period. Temperature was maintained at 200° C.±5° C. for two hours at which time the acid number was 52. 302 g. of wood rosin was melted and added to the alkyd, the temperature was raised to 240° C. and held there for thirty minutes. Reaction was essentially complete at this time and the alkyd was cooled to 160° C., 0.09 g. of quinone was added and cooling continued to 130° C. To the alkyd was then added 295 g. of styrene and the liquid resin cooled to room temperature.

The resin was catalyzed with one and one-half percent of benzoyl peroxide and cast in a one-eighth inch thick piece.

Physical test data was as follows.

Liquid resin:
Disc viscosity (poises) _____ 75
Styrene compatibility _____pts__ 200+

Cured resin:
Tensile _____p.s.i__ 2650
Elongation _____percent__ .6
Torsional modulus 27° C. _____p.s.i__ 535,000
Heat distortion temperature (temperature of 1,000,000 p.s.i. modulus) _____° C__ 122
Rockwell L _____ 122
Rockwell M _____ 114
Water absorption (24 hrs.) _____percent__ +.20

*Example 6*

A two-liter three-necked flask equipped as in Example 5 was charged with 232 g. of fumaric acid, and 214 g. of 1,5-pentanediol. The mixture was brought to a temperature of 195° C. over a four hour period with stirring under a blanket of carbon dioxide at which time the acid number was 33. To the molten alkyd was added 302 g. of melted rosin and the mixture then heated to 240° C. In five minutes at this temperature viscosity of the alkyd had increased markedly and was assumed to be completely reacted. The alkyd was cooled, inhibited with 0.09 g. of quinone and diluted with 333 g. of styrene.

The liquid resin mix was catalyzed and a cured sheet ⅛" thick prepared for testing.

Torsional modulus at 27° C _____p.s.i__ 120,650
Torsional modulus at 43.5° C. _____p.s.i__ 109,271
Tensile _____p.s.i__ 2,640
Elongation _____percent__ 7.5
Rockwell L _____ 41
Water absorption _____percent__ +.16

*Example 7*

A three-necked three-liter flask equipped with stirrer, Dean and Stark water-trap and gas-inlet tube was charged with 232 g. fumaric acid and 276 g. of dipropylene glycol. The mixture was brought to 205° C. over a six hour period under a blanket of carbon dioxide with stirring at which time the acid number had dropped to 58. Recrystallized abietic acid (302 g.) was then added as a melt and the mixture heated to 240° C. and maintained at that temperature for ten minutes. The alkyd was then cooled, .08 g. quinone and 330 g. of styrene added.

The liquid resin mix was catalyzed with one and one-half percent of benzoyl peroxide and cast in a ⅛" sheet for physical testing.

Torsional modulus at 25° C. _____p.s.i__ 500,000
Heat distortion temperature (temperature of 100,000 p.s.i. torsional modulus) _____° C___ 84
Tensile _____p.s.i__ 5,530
Elongation _____percent__ 1.3
Rockwell L _____ 115
Rockwell M _____ 98

*Example 8*

A flask equipped as described in Example 7 was charged with 562 g. (4.2 moles) of dipropylene glycol and 392 g. (4.0 moles) of maleic anhydride. Carbon dioxide was introduced by bubbling through the reactants during the course of alkyd preparation. The temperature was raised to 200° C. After six hours at this temperature the acid number was 36. Molten rosin (604 g.) at 155° C. was added to the polyester already formed. The temperature was then increased to 240° C. and maintained for forty minutes at this temperature. The alkyd was then cooled to 150° C. and 0.3 g. of quinone added. When the temperature had dropped to 130° C., sufficient styrene was added to yield a resin of one-third monomer by weight.

Physical properties of the cured resin are given.

Cured resin:

| | |
|---|---|
| Tensile strength _____p.s.i__ | 5480 |
| Elongation, percent _____ | 1.2 |
| ASTM heat distortion temperature ____° C___ | 77 |
| Rockwell hardness L _____ | 114 |
| Rockwell hardness M _____ | 98 |

Although it is the fumarate moiety that reacts with rosin to yield the rosin modified alkyd, this example illustrates that the reactive alkyd may be prepared from the anhydride of maleic acid or from fumaric acid. It is well known that substantial isomerization of maleate to fumarate moiety occurs at 200° C. I prefer to preform the alkyd and subsequently add the rosin thereto. In this way more and more maleate groups are isomerized at the very high temperature of about 240° C. as the rosin reacts with the fumarate groups.

*Example 9*

A 5-liter 3-necked round bottom flask equipped with a stirrer, a gas inlet tube and a Dean-Stark water trap was charged with 1160 g. of fumaric acid (10.0 M) 1340 g. of dipropylene glycol (10.0 M) and 302 g. of wood rosin. The mixture was heated to 226° C. under a blanket of carbon dioxide in 5.5 hours at which time 350 mls. of water had distilled into the water trap. Heating was then increased such that the temperature rose to 235° C. in 45 minutes and the alkyd then allowed to cool with stirring. When the temperature had dropped to 160° C., 0.36 g. of hydroquinone was added as a 25% solution in ethylene glycol. The alkyd was allowed to cool further to 125° C. and 1220 g. of styrene, which contained sufficient copper naphthenate to give one part of copper per million parts of finished resin, was added. The resulting resin had an acid number of 36.

A solid casting one-eighth inch thick was prepared by catalyzing the resin with one percent benzoyl peroxide and pouring into a mold of appropriate dimensions. Curing was accomplished by heating the resin at 55° C. for 16 hours, at 70° C. for one hour and at 110° C. for 1.5 hours. Physical properties of the casting were as follows:

| | |
|---|---|
| Tensile strength _____p.s.i__ | 4160 |
| Elongation _____percent__ | 0.97 |
| Specific gravity _____ | 1.15 |

This example illustrates the preparation of resins wherein the mole ratio of rosin (based on abietic acid molecular weight) is quite low compared to the fumaric acid charged (0.1:1.0). The resins provided by low rosin in the charge are most useful where high reactivity resins are desirable, such as in matched die molding.

I can sell the alkyd to the user who may blend it with the copolymerizable vinyl monomer or I can sell the uncured liquid solution of the alkyd in the monomer. In all cases, of course, the user adds the necessary polymerization catalyst which almost invariably is an organic peroxide.

Having thus described my invention, what I claim and desire to protect by Letters Patent is:

1. A resin consisting essentially of a polymerizable solid Diels-Alder reaction product of a material selected from the group consisting of rosin and abietic acid with a fumarate polyester of an aliphatic glycol, containing from 2 to 6 carbon atoms, and a fumaric acid, in which resin the proportion of said material ranges from about 30 to about 230 grams for each gram-mole of the fumaric acid constituent of the fumarate polyester, and the said reaction product containing double bonds attributable to unreacted fumarate groups.

2. A reaction product as set forth in claim 1 in which the fumarate polyester is formed in situ from the aliphatic glycol which contains from 2 to 6 carbon atoms and fumaric acid in the presence of and prior to the reaction with the rosin.

3. A reaction product as set forth in claim 1 in which the polyester is preformed before admixture with the rosin.

4. A resinous copolymer of a polymerizable reaction product as set forth in claim 1 with a copolymerizable vinyl monomer selected from the group consisting of styrene, vinyl toluene, vinyl acetate, butyl acrylate, methyl methacrylate, vinyl naphthalene, and diallyl phthalate.

5. A resinous copolymer of a polymerizable reaction product as set forth in claim 1 with styrene.

6. A new composition of matter comprising a liquid solution of a polymerizable reaction product as set forth in claim 1 in a copolymerizable vinyl monomer selected from the group consisting of styrene, vinyl toluene, vinyl acetate, butyl acrylate, methyl methacrylate, vinyl naphthalene, and diallyl phthalate.

7. A new composition of matter comprising a liquid solution of a polymerizable reaction product as set forth in claim 1 in styrene.

References Cited in the file of this patent

UNITED STATES PATENTS

| | | |
|---|---|---|
| 2,411,904 | Spiller | Dec. 3, 1946 |
| 2,514,389 | Glick | July 11, 1950 |